United States Patent
Clevorn et al.

(10) Patent No.: US 10,075,876 B2
(45) Date of Patent: Sep. 11, 2018

(54) METHOD AND APPARATUS FOR HOST-CONTROLLED PACKET DATA SUPPRESSION

(75) Inventors: Thorsten Clevorn, Munich (DE); Juergen Kreuchauf, San Francisco, CA (US); Christian Drewes, Germering (DE)

(73) Assignee: Intel Deutschland GmbH, Neubiberg (DE)

( * ) Notice: Subject to any disclaimer, the term of this patent is extended or adjusted under 35 U.S.C. 154(b) by 121 days.

(21) Appl. No.: 13/465,076

(22) Filed: May 7, 2012

(65) Prior Publication Data
US 2013/0294238 A1   Nov. 7, 2013

(51) Int. Cl.
*H04W 28/10* (2009.01)
*H04L 12/851* (2013.01)

(52) U.S. Cl.
CPC .............. *H04W 28/10* (2013.01); *H04L 47/24* (2013.01)

(58) Field of Classification Search
CPC ........ H04L 47/14; H04L 47/24; H04W 28/22; H04W 88/06; H04W 28/10; H04W 88/10; H04W 51/281; H04W 72/1242; H04W 88/02; H04W 28/18; H04W 76/15; H04W 76/16; H04W 28/06; H04W 72/10; H04W 28/08; H04W 47/25; H04W 47/32
USPC .... 370/216, 218, 229, 230.1, 233, 235, 270, 370/328, 331, 332, 335, 342, 343, 344, 370/351, 352, 353, 354, 358, 389, 391, 370/395.21, 395.42, 455, 464, 493
See application file for complete search history.

(56) References Cited

U.S. PATENT DOCUMENTS

| | | | | |
|---|---|---|---|---|
| 6,005,852 A | * | 12/1999 | Kokko | .................. H04W 28/14 370/329 |
| 7,197,330 B1 | * | 3/2007 | Monroe et al. | ................ 455/557 |
| 7,290,064 B2 | | 10/2007 | Patel et al. | |
| 7,839,892 B2 | | 11/2010 | Eckert et al. | |
| 8,169,904 B1 | * | 5/2012 | Breau | ................... H04L 47/263 370/231 |

(Continued)

FOREIGN PATENT DOCUMENTS

| | | |
|---|---|---|
| CN | 1759542 A | 4/2006 |
| CN | 101542934 A | 9/2009 |

(Continued)

OTHER PUBLICATIONS

Office Action received for the Chinese application No. 201310281854.7, dated Nov. 19, 2015, 13 pages and its English translation 23 pages.

(Continued)

*Primary Examiner* — Paul H Masur
*Assistant Examiner* — Michael K Phillips
(74) *Attorney, Agent, or Firm* — Viering Jentschura & Partner MBB

(57) ABSTRACT

The various aspects comprise methods and devices for managing signal traffic. The various aspects comprise a data controller module. The data controller module may be configured to receive information of an exchange of data with a plurality of data types having a plurality of data rates in a network communication; identify a sensitive condition of the network communication; and responsive to identifying the sensitive condition, reduce a rate of data of at least one data type of the plurality of data types.

24 Claims, 12 Drawing Sheets

(56) References Cited

U.S. PATENT DOCUMENTS

| | | | |
|---|---|---|---|
| 8,363,672 B2* | 1/2013 | Ben-Haim | H04L 12/66 370/468 |
| 2003/0099255 A1* | 5/2003 | Kekki et al. | 370/469 |
| 2003/0135638 A1* | 7/2003 | Brabson et al. | |
| 2003/0179720 A1* | 9/2003 | Cuny | H04L 47/14 370/310 |
| 2003/0236827 A1* | 12/2003 | Patel | H04L 41/0896 709/203 |
| 2004/0052212 A1* | 3/2004 | Baillargeon | 370/235 |
| 2004/0071086 A1* | 4/2004 | Haumont et al. | 370/230 |
| 2004/0179605 A1* | 9/2004 | Lane | 375/240.18 |
| 2005/0135320 A1* | 6/2005 | Tiedemann et al. | 370/338 |
| 2005/0282571 A1* | 12/2005 | Oprescu-Surcobe et al. | 455/503 |
| 2007/0043829 A1* | 2/2007 | Dua | 709/219 |
| 2008/0062876 A1* | 3/2008 | Giroux | H04L 12/2856 370/235 |
| 2008/0130728 A1* | 6/2008 | Burgan et al. | 375/222 |
| 2008/0186918 A1* | 8/2008 | Tinnakornsrisuphap et al. | 370/331 |
| 2008/0293429 A1* | 11/2008 | Harris et al. | 455/453 |
| 2008/0299963 A1* | 12/2008 | Balachandran | H04L 47/10 455/422.1 |
| 2008/0320526 A1* | 12/2008 | Franceschini | H04W 76/025 725/62 |
| 2009/0154367 A1* | 6/2009 | Aaron | H04L 67/32 370/252 |
| 2009/0180451 A1* | 7/2009 | Alpert et al. | 370/338 |
| 2009/0252134 A1* | 10/2009 | Schlicht et al. | 370/338 |
| 2010/0159976 A1* | 6/2010 | Marocchi et al. | 455/519 |
| 2010/0220679 A1* | 9/2010 | Abraham et al. | 370/329 |
| 2011/0044262 A1* | 2/2011 | Satapathy et al. | 370/329 |
| 2011/0176423 A1 | 7/2011 | Chowdhury et al. | |
| 2012/0028626 A1* | 2/2012 | Marocchi et al. | 455/422.1 |
| 2012/0033590 A1* | 2/2012 | Jazra et al. | 370/310 |
| 2012/0092991 A1* | 4/2012 | Jeong et al. | 370/235 |
| 2012/0113982 A1* | 5/2012 | Akselin et al. | 370/355 |
| 2012/0170503 A1* | 7/2012 | Kelley | H04W 48/06 370/312 |
| 2012/0250509 A1* | 10/2012 | Leung et al. | 370/235 |
| 2012/0309445 A1* | 12/2012 | Tsui | H04W 24/08 455/522 |
| 2012/0314692 A1* | 12/2012 | Tinnakornsrisuphap et al. | 370/338 |
| 2013/0023260 A1* | 1/2013 | Shu | H04W 36/28 455/418 |
| 2013/0033990 A1* | 2/2013 | Catovic | H04W 28/06 370/242 |
| 2013/0040638 A1* | 2/2013 | George et al. | 455/426.1 |
| 2013/0094371 A1* | 4/2013 | Vallath | H04W 76/045 370/252 |
| 2013/0148574 A1* | 6/2013 | Liu et al. | 370/328 |
| 2013/0196673 A1* | 8/2013 | Smadi et al. | 455/450 |
| 2013/0205002 A1* | 8/2013 | Wang | H04L 69/16 709/224 |
| 2013/0288700 A1* | 10/2013 | Enstrom | H04W 28/0289 455/453 |
| 2017/0223721 A1* | 8/2017 | Austin | H04W 72/085 |

FOREIGN PATENT DOCUMENTS

| | | |
|---|---|---|
| WO | 2004084004 A2 | 9/2004 |
| WO | 2008067189 A2 | 6/2008 |
| WO | 2012051044 A1 | 4/2012 |

OTHER PUBLICATIONS

German Office Action based on Application No. 102013104718.1 (7 Pages) dated Feb. 8, 2017 (Reference Purpose Only).

* cited by examiner

METHOD AND APPARATUS FOR HOST-CONTROLLED PACKET DATA SUPPRESSION

TECHNICAL FIELD

Aspects of this disclosure relate generally to network traffic. In particular, an aspect of this disclosure relates to managing network signal traffic in sensitive conditions.

BACKGROUND

The 3GPP standard for 3G/UMTS allows a feature called MRAB (Multi-Radio Access Bearer): use of packet-switched data during voice calls. In contrast to, for example, a CDMA standard where this is not possible, MRAB gives the advantage in user experience in using voice and data services at the same time, but also makes the system more fragile in voice call stability due to additional signaling and reconfiguration load or distribution of limited transmission power across the different physical uplink channels. Having less voice call stability results in a higher call drop rate during MRAB (CS and PS traffic) compared to voice-only (CS traffic).

Therefore, it would be advantageous to have a method, system, and computer program product that addresses one or more of the issues discussed above.

SUMMARY

An aspect of this disclosure includes a method for managing network traffic. The method comprises receiving information of an exchange of data with a plurality of data types having a plurality of data rates in a network communication; identifying a sensitive condition of the network communication; and responsive to identifying the sensitive condition, adjusting a rate of data of at least one data type of the plurality of data types.

Another aspect of this disclosure includes a device. The device comprises a data controller module. The data controller module may be configured to receive information of an exchange of data with a plurality of data types having a plurality of data rates in a network communication; identify a sensitive condition of the network communication; and responsive to identifying the sensitive condition, reduce a rate of data of at least one data type of the plurality of data types Yet another aspect of this disclosure includes a system for managing data traffic. The system includes a receiving device and a data controller module. The receiving device may comprise a modem configured to exchange of data with a plurality of data types having a plurality of data rates in a network communication. The data controller module may be configured to receive information about the communication; identify a sensitive condition of the network communication; and responsive to identifying the sensitive condition, reduce a rate of data of at least one data type of the plurality of data types to the modem.

BRIEF DESCRIPTION OF DRAWINGS

In the drawings, like reference characters generally refer to the same parts throughout the different views. The drawings are not necessarily to scale. In the following description, aspects of this disclosure are described with reference to the following drawings, in which.

DETAILED DESCRIPTION

The following detailed description refers to the accompanying drawings that show, by way of illustration, specific details and aspects in which the invention may be practiced. The word "exemplary" is used herein to mean "serving as an example, instance, or illustration". Any aspect or design described herein as "exemplary" is not necessarily to be construed as preferred or advantageous over other aspects or designs.

Note that in this Specification, references to various features (e.g., elements, structures, modules, components, steps, operations, characteristics, etc.) included in "one aspect", "example aspect", "an aspect", "another aspect", "some aspects", "various aspects", "other aspects", "alternative aspect", and the like are intended to mean that any such features are included in one or more aspects of the present disclosure, but may or may not necessarily be combined in the same aspects.

Note that in this Specification, references to "a number of" may mean one or more. For example, a number of objects may be one object, ten objects, fifty objects, or any number of objects. Also note that in this Specification, references to "at least one of" may mean any combination. For example, at least one of object A and object B may be object A, object B, or both objects A and B.

Although the description is illustrated and described herein with reference to certain aspects, the description is not intended to be limited to the details shown. Modifications may be made in the details within the scope and range equivalents of the claims.

Figure 1:
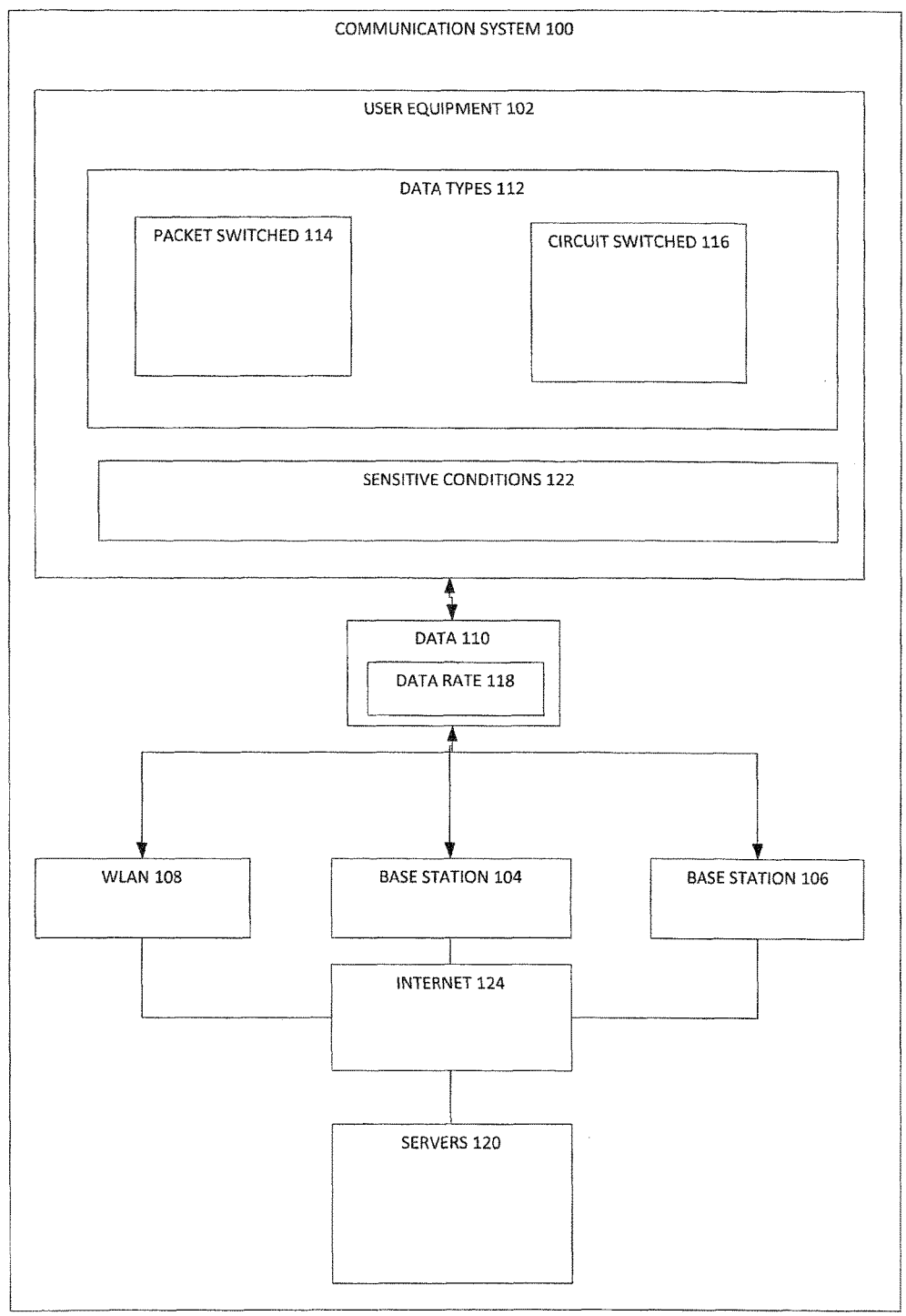
FIG. 1 is shows a communication system in accordance with one aspect of the present disclosure.

FIG. 1 is shows a communication system in accordance with one aspect of the present disclosure.

In this example, communication system 100 may include suitable interfaces for receiving, transmitting, and/or otherwise communicating data or information in a network environment. Such network interfaces may be inclusive of multiple wireless technologies, for example, WiFi, WiMax, 3G, 4G, white space, 802.11x, satellite, Bluetooth, near field communication, LTE, GSM/WCDMA/HSPA, CDMA1×/EVDO, DSRC, CAN, GPS, etc. Other interfaces may include physical ports, for example, Ethernet, USB, HDMI, etc.

Communication system 100 may include user equipment 102, base stations 104 and 106, and wireless access point 108. In other aspects, communication system 100 may include more or less base stations 104 and user equipment devices 102 depending on the application.

User equipment 102 may be referred to as a communication terminal or mobile device. User equipment 102 may include network interfaces for receiving, transmitting, and/or otherwise communicating data or information. User equipment 102 can be a hand-held mobile phone, a computer equipped with a mobile broadband adapter, or any other device capable of communicating with base stations 104 and 106.

In an aspect of this disclosure, communication system 100 may be a Universal Mobile Telecommunications System (UMTS) mobile radio system. Each of the base stations 104 and 106 may also be NodeBs as defined in UMTS.

User equipment 102 may exchange data 110 with each base station 104, 106. Data 110. Data 110 may be in the form of different data types 112 including packet switched data 114 and circuit switched data 116.

Packet switched data 114 is exchanged over a packet switching communication method that groups all transmitted data—regardless of content, type, or structure—into suitably sized blocks, called packets. Packet switching features delivery of variable-bit-rate data streams (sequences of packets) over a shared network. When traversing network adapters, switches, routers and other network nodes, packets may be buffered and queued, resulting in variable delay and throughput depending on the traffic load in the network. A use for packet switched data 114 may be when user equipment 102 accesses the Internet. Packet switched data 114 may be exchanged with base stations 104, 106 at data rate 118.

Circuit switched data 116 is exchanged over a circuit switched communication method in which two network nodes establish a dedicated communications channel (circuit) through the network before the nodes may communicate. The circuit guarantees the full bandwidth of the channel and remains connected for the duration of the communication session. The circuit functions as if the nodes were physically connected as with an electrical circuit. A use for circuit switched data 116 may be when user equipment 102 is used by a user to make voice calls.

Additionally, communication system 100 may include servers 120. Servers 120 may be associated with different programs or applications on user equipment 102. Servers 120 may exchange data with user equipment 102 related to a corresponding application or program. For example, an email program on user equipment 102 may receive emails from an email account of a user from an email server. Servers 120 may be connected to user equipment 102 through Internet 124 which is connected to the wireless network of base stations 104, 106 and WLAN 108.

Additionally, user equipment 102 may include sensitive conditions 122. Sensitive conditions 122 may be conditions which increase the expectations of a dropped voice call during circumstances where packet switched and circuit switched data is being used. In different aspects, other data types may be used instead or with packet switched and circuit switched data types.

Sensitive conditions 122 may be related to conditions of user equipment 102, base stations 104, 106, and/or servers 120. However, for convenience, they are only shown within user equipment 102 in FIG. 1.

In an aspect of this disclosure, sensitive conditions 122 may include approaching a maximum transmission power. As user equipment 102 is moved further from a base station that user equipment 102 is exchanging data with, the transmission power on user equipment may be increased. As the transmission power on user equipment 102 reaches a maximum power, there is an increased chance that a call disconnect may occur.

In another aspect, sensitive conditions 122 may include preparing to active or activating compressed mode. In yet another aspect, sensitive conditions 122 may include any conditions leading to degraded uplink conditions. For example, activation of HSDPA. Also, in another aspect, sensitive conditions 122 may include HSUPA being configured.

In even further aspects, sensitive conditions 122 may include when the uplink capacity is reached and/or there are degrading conditions. Degrading conditions may exist when there is a low signal level. For example, the received signal code power is below a threshold and/or the received signal strength indication is below a threshold. Also, degrading conditions may exist when there is a low signal-to-noise ratio (SNR). For example, the signal chip power (Ec/No) is below a threshold, the dedicated physical channel signal-to-noise ratio and/or the HSDPA CQI is below a threshold. Additionally, degrading conditions may include some indirect indicators for a low signal level or low SNR. For example, there may be a high block error rate, a low E-TFCI of HSUPA, a high/raised SNR target, and/or downlink/uplink power control (DLPC/ULPC) requesting power up mostly. The degrading conditions may also include high frequency offsets.

In another aspect of this disclosure, sensitive conditions 122 may include recently one or several out-of-sync indications observed in the UE, frequent serving cell (or active set of serving cells) updates, requests for new cell not answered by the network (waiting longer than usual), and/or a high number of missed packets (sequence numbers of transmitted and actually ACKed packets diverging in buffer).

In different aspects of this disclosure, sensitive conditions 122 may include other sensitive conditions not included in the lists above.

The various aspects of this disclosure recognize and take into account that cellular modem internal information can be exposed to the application domain with value and timing accuracy depending on the use case and information element requirements. This might need to happen either via existing, standardized and mandatory interfaces (e.g. AT Command extension to 3GPP 27.070), or via any serial or parallel HW interface in a proprietary format.

The application then can decide whether to allow the flow of data during an ongoing voice-call (MRAB on cellular modem level) or not (CS-only on modem level) by blocking any application data before running in and out from the cellular modem. Most likely this will result in releasing all Data RBs in the modem, or even deactivate all PDP contexts.

The different aspects of this disclosure recognize and take into account that the transmitter should not overload the receiver when there is information known that the receiver is already in a strained or sensitive condition. Also, a receiver should not request (e.g. on higher layer, app level) more data than it can handle, e.g. because it knows it is in trouble on the lower layer.

Figure 2:
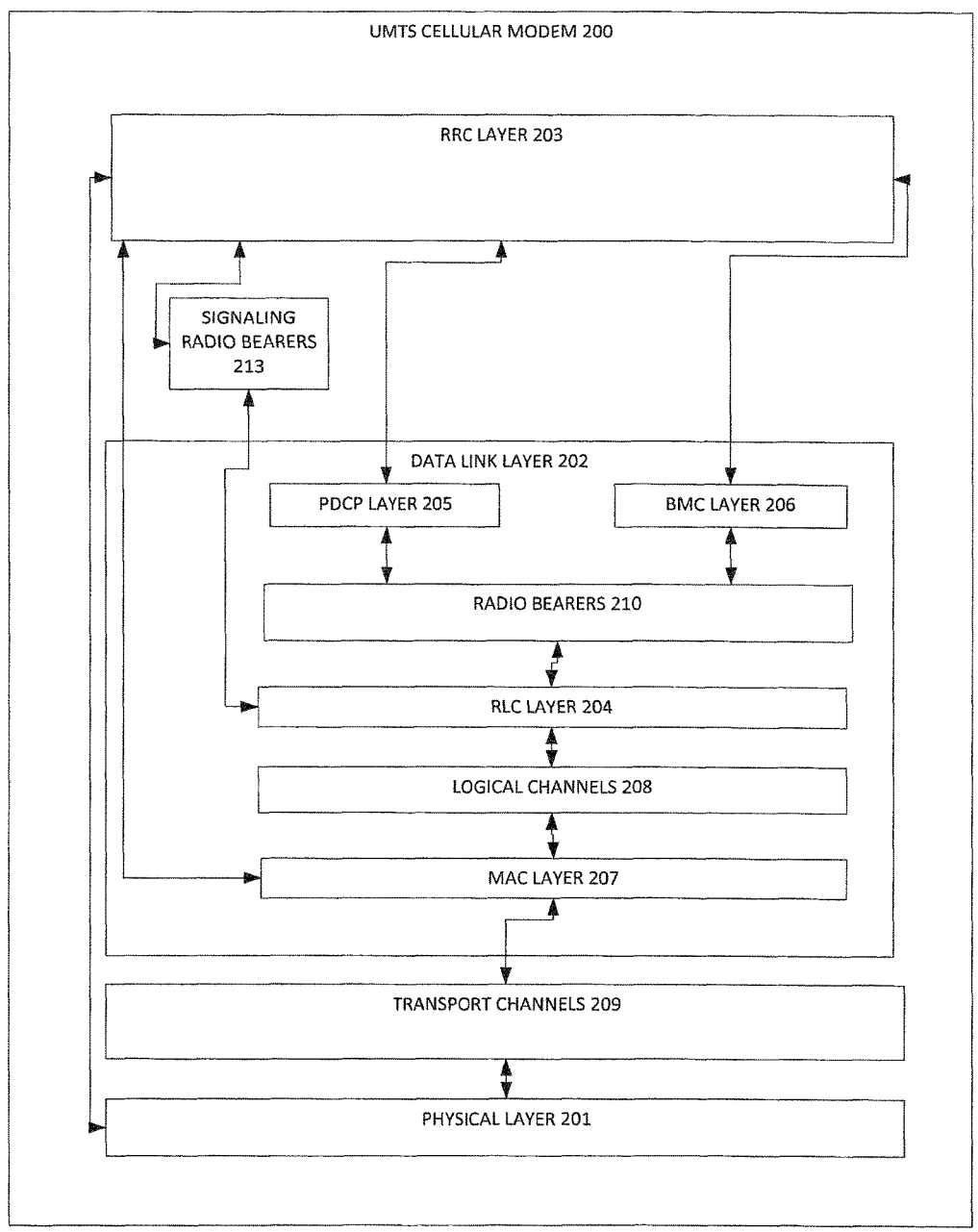
FIG. 2 shows an illustration of a protocol structure for a UMTS cellular modem in accordance with one aspect of the present disclosure.

FIG. 2 shows an illustration of a protocol structure for a UMTS cellular modem in accordance with one aspect of the present disclosure.

As FIG. 2 shows, the UMTS cellular modem 200 is logically divided into three protocol layers. The units (entities) ensuring and providing the functionality of the respective protocol layers described below are implemented both in a mobile radio terminal, such as user equipment 102 and in a UMTS base station, such as base stations 104 and 106 as shown in FIG. 1.

The bottommost layer shown in FIG. 2 is the physical layer 201, which represents the protocol layer 1 on the basis of the OSI reference model (Open System Interconnection), defined by ISO (International Standardization Organization).

The protocol layer arranged above physical layer 201 is data link layer 202, protocol layer 2 on the basis of the OSI reference model, which for its part has a plurality of sub-protocol layers, namely the Medium Access Control protocol Layer 207 (MAC protocol layer), the Radio Link Control protocol layer 204 (RLC protocol layer), the Packet Data Convergence Protocol layer 205 (PDCP protocol layer), and also the Broadcast/Multicast Control protocol layer 206 (BMC protocol layer).

The topmost layer of the UMTS cellular modem is the mobile radio network layer (protocol layer 3 on the basis of the OSI reference model), having the mobile radio resource control unit 203 (Radio Resource Control protocol layer, RRC protocol layer).

Each protocol layer 201, 202, 203 provides the protocol layer above it with its services via prescribed, defined service access points.

On the basis of UMTS, the protocol structure shown in FIG. 2 is split not just horizontally into the above-described protocol layers and units of the respective protocol layers, but also vertically into a "control protocol plane" (Control plane, C plane), which contains parts of physical layer 201, parts of MAC protocol layer 207, parts of RLC protocol layer 204 and also RRC protocol layer 203, and the user protocol plane (User plane, U plane), which contains parts of physical layer 201, parts of MAC protocol layer 207, parts of RLC protocol layer 204, PDCP protocol layer 205 and also BMC protocol layer 206.

The units of the control protocol plane are used to transmit exclusively control data, which are required for the establishment, release and also maintenance of a communication link, whereas the units of the user plane are used to transmit the user data, e.g. data originating from a speech call.

Each protocol layer or each unit (entity) of a respective protocol layer has particular prescribed functions during mobile radio communication. The transmitter end needs the task of the physical layer 201 or of the units of the physical layer 201, to ensure the secure transmission of data coming from the MAC protocol layer 207. In this connection, the data are mapped onto physical channels (not shown in FIG. 2). The physical layer 201 provides the MAC protocol layer 207 with its services via transport channels 209 and these are used to stipulate how and with what characteristics the data are to be transmitted. The fundamental functions which are provided by the units of the physical layer 201 include channel coding, modulation and CDMA code spreading. Correspondingly, the physical layer 201 or the entities of the physical layer 201 at the receiver end performs the CDMA code despreading, demodulation and the decoding of the received data and then forwards these data to the MAC protocol layer 207 for further processing.

The MAC protocol layer 207 or the units of the MAC protocol layer 207 provides or provide the RLC protocol layer 204 with its or their services using logical channels 208 as service access points and these are used to characterize what type of data are to be transmitted via the air interface. The task of the MAC protocol layer 207 in the transmitter, i.e. during data transmission in the uplink direction in the mobile radio terminal 118, is particularly to map the data which are present on a logical channel 208 above the MAC protocol layer 207 onto the transport channels 209 of the physical layer 201. The physical layer 201 provides the transport channels 209 with discrete transmission rates for this. It is therefore a function of the MAC protocol layer 207 or of the entities of the MAC protocol layer 207 in the mobile radio terminal in the transmission situation to select a suitable transport format (TF) for each configured transport channel on the basis of the respective current data transmission rate and the respective data priority of the logical channels 208 which are mapped onto the respective transport channel 209, and also the available transmission power of the mobile radio terminal (UE). A transport format contains, inter alia, a stipulation of how many MAC data packet units, called transport block, are transmitted, in other words transferred, to the physical layer 201 via the transport channel 209 per transmission period TTI (Transmission Time Interval). The allowed transport formats and also the allowed combinations of the transport formats for the various transport channels 209 are signaled to the mobile radio terminal by a mobile radio network control unit when a communication link is set up. In the receiver, the units of the MAC protocol layer 207 split the transport blocks received on the transport channels 209 over the logical channels 208 again.

The MAC protocol layer or the units of the MAC protocol layer 207 normally has or have three logical units. The "MAC-d unit" (MAC dedicated unit) handles the user data and the control data, which are mapped onto the dedicated transport channels DCH (Dedicated Channel) via the corresponding dedicated logical channels DTCH (Dedicated Traffic Channel) and DCCH (Dedicated Control Channel). The MAC-c/sh unit (MAC control/shared unit) handles the user data and the control data from logical channels 208, which are mapped onto the common transport channels 209, such as the common transport channel RACH (Random Access Channel) in the uplink direction or the common transport channel FACH (Forward Access Channel) in the downlink direction. The MAC-b unit (MAC broadcast unit) handles only the mobile radio cell-related system information, which is mapped via the logical channel BCCH (Broadcast Control Channel) onto the transport channel BCH (Broadcast Channel) and is broadcast to all of the mobile radio terminals in the respective mobile radio cell.

Using the RLC protocol layer 204 or using the units of the RLC protocol layer 204, the RRC protocol layer 203 is provided with its services by means of signaling radio bearers (SRB) 213 as service access points, and the PDCP protocol layer 205 and the BMC protocol layer 206 are provided with their services by means of radio bearers (RB) 210 as service access points. The signaling radio bearers and the radio bearers characterize the way in which the RLC protocol layer 204 needs to handle the data packets. To this end, by way of example, the RRC protocol layer 203 stipulates the transmission mode for each configured signaling radio bearer or radio bearer. The following transmission modes are provided in UMTS: Transparent mode (TM); Unacknowledged mode (UM); or Acknowledged mode (AM).

The RLC protocol layer 204 is modeled such that there is an independent RLC entity for each radio bearer or signaling radio bearer. In addition, the task of the RLC protocol layer 204 in the transmission device is to segment or assemble the user data and the control data from radio bearers or signaling radio bearers into data packets. The RLC protocol layer 204 transfers the data packets produced after the segmentation or the assembly to the MAC protocol layer 207 for further transport or for further processing.

The PDCP protocol layer 205 or the units of the PDCP protocol layer 205 is or are set up to transmit or to receive data from the "Packet Switched Domain" (PS domain). The main function of the PDCP protocol layer 205 is to compress or decompress the IP header information (Internet Protocol header information).

The BMC protocol layer 206 or its entities is or are used to transmit or to receive "cell broadcast messages" via the air interface.

The RRC protocol layer 203 or the entities of the RRC protocol layer 203 is or are responsible for the establishment, release and reconfiguration of physical channels, transport channels 209, logical channels 208, signaling radio bearers 213 and radio bearers 210 and also for the configuration of the parameters of the protocol layer 1, i.e. of the physical layer 201 and of the protocol layer 2. To this end, the RRC units, i.e. the units of the RRC protocol layer 203, in the mobile radio network control unit 106, 107 and the respective mobile radio terminal exchange appropriate RRC messages, via the signaling radio bearers 213.

In FIGS. 3-10, various aspects of user equipment are shown. It is understood that different components of each of these aspects may be used in combination with other aspects. Additionally, all aspects of this disclosure are not limited to these aspects. Furthermore, similar reference numerals are reused in the Figures for simplicity. However, it is understood that similar components in each Figure may still be different.

Figure 3:
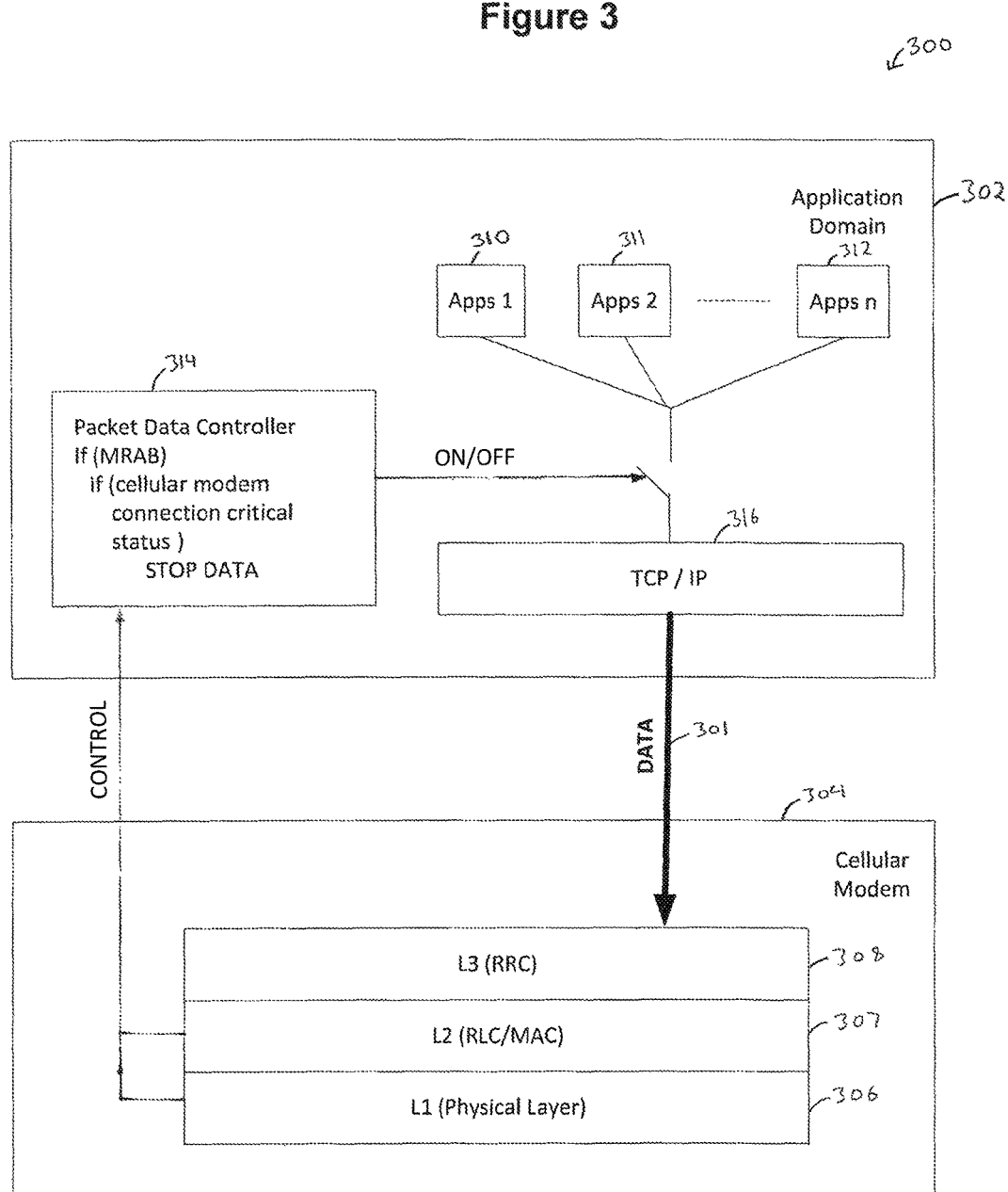
FIG. 3 shows a block diagram of user equipment with a data control module that controls communications to all applications in the application domain with a single message in accordance with one aspect of the present disclosure.

FIG. 3 shows a block diagram of user equipment with a data control module that controls communications to all applications in the application domain with a single message in accordance with one aspect of the present disclosure. In an aspect, user equipment 300 is an example of user equipment 102 as shown in FIG. 1. User equipment 300 may also be referred to as a receiving device.

User equipment 300 may include application domain 302 and cellular modem 304. Application domain 302 may communicate with cellular modem 304 in order to process data 301 exchanged between user equipment 300 and a base station.

Cellular modem 304 may be an illustrative aspect of cellular modem 200 as shown in FIG. 2. In different aspects, cellular modem 304 may include other components than cellular modem 200 or may not include components illustrated in cellular modem 200. Cellular modem 304 may be configured to send information about a communication of user equipment 302 with another network interface to data controller module 314.

In an aspect, cellular modem 304 includes physical layer 306, data link layer 307, and radio resource control layer 308. Layers 306-308 may be examples of layers 201-203 as shown in FIG. 2.

Application domain 302 may include applications 310-312. In one or more aspects, application domain 302 may include any number of applications. Applications 310-312 may be programs on user equipment 300 which produce and utilize packet switched data. Applications 310-312 may include, for example, Internet browsers, email fetchers, games, social networking services, and any other type of suitable application.

Application domain 302 may also include data controller module 314 and transport layer 316.

Transport layer 316 provides end-to-end communication services for applications 310-312 within the layered architecture of network components and protocols. Transport layer 316 may exchange data 301 with radio resource control layer 308 and applications 310-312. Transport layer 316 may include Transmission Control Protocol (TCP) and Internet Protocol (IP).

Data controller module 314 may control the flow of data coming to and from applications 310-312. In an aspect, data controller module 314 may be connected directly or indirectly to cellular modem 304. Cellular modem 314 may send information related to a communication which user equipment 300 is having with another network interface. The information may be whatever information is necessary for data controller module 314 to identify whether a sensitive condition exists or not.

A sensitive condition is a condition in which user equipment 302 is in risk for having an unintended disconnection of a voice call or circuit switched communication due to network constraints. For example, when user equipment 302 is approaching maximum transmission power, there is a sensitive condition.

Data controller module 314 may also be in communication with applications 310-312. Data controller module 314 may reduce and if necessary, stop the data rate of data 301 coming from applications 310-312. In an aspect, data controller module 314 may send a message to applications 310-312 to reduce the data rate themselves. In another aspect, data controller module 314 may reduce the data rate between the application layer and transport layer 316.

Figure 4:
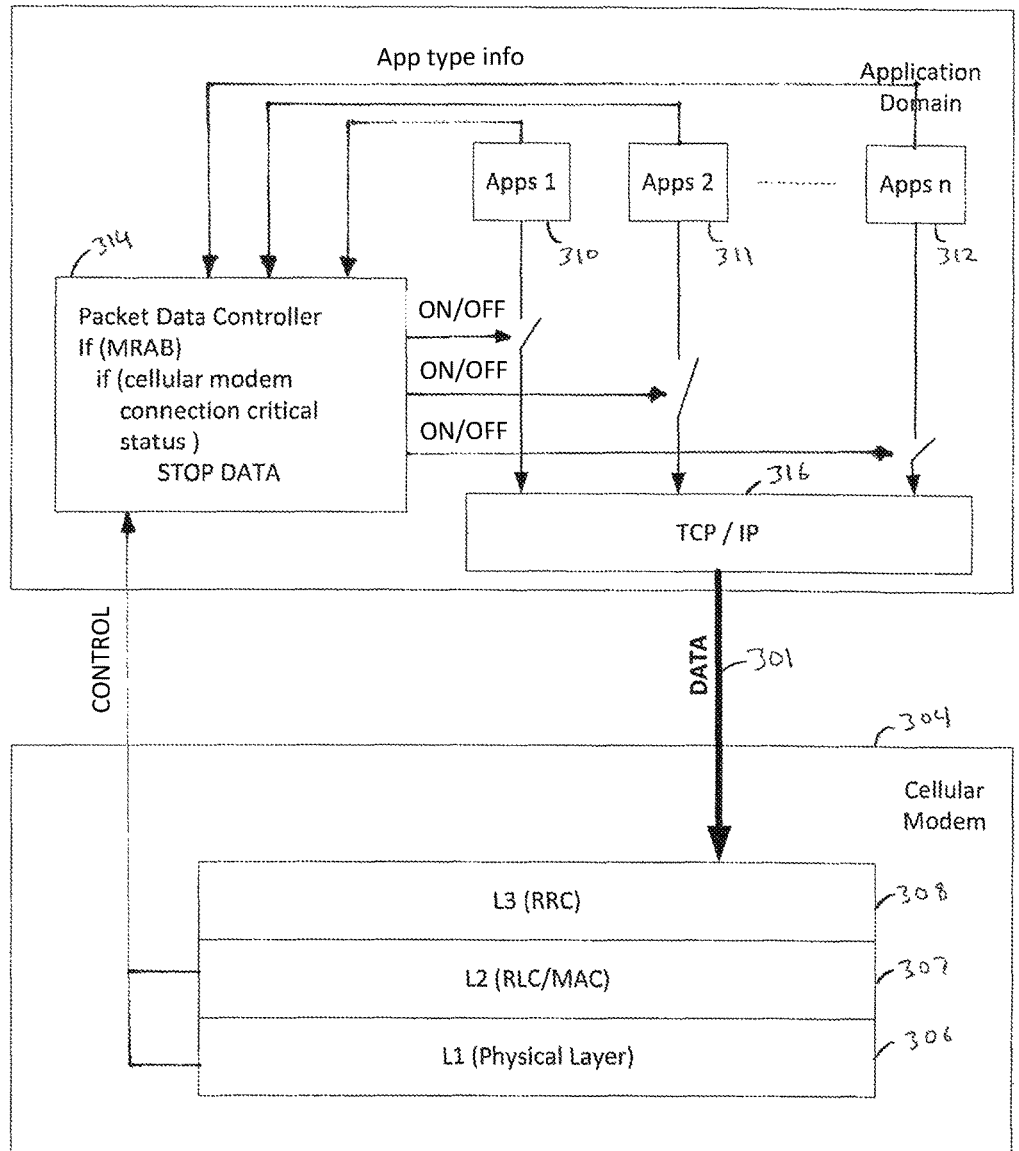
FIG. 4 shows a block diagram of user equipment with a data control module that controls communications to individual applications in the application domain with individual messages in accordance with one aspect of the present disclosure.

FIG. 4 shows a block diagram of user equipment with a data control module that controls communications to individual applications in the application domain with individual messages in accordance with one aspect of the present disclosure. In an aspect, user equipment 400 is an example of user equipment 102 as shown in FIG. 1.

User equipment 400 is similar to user equipment 300. However, in this illustrative aspect, data controller module 314 may individually send a message to each application to reduce the data rate. For example, data controller module 314 may send a message to the applications which exchange the most data. In another aspect, data controller module 314 may send a message to the most frequently used applications. Also, data controller module 314 may reduce the data rate itself between the application layer and transport layer 316.

Additionally, in an aspect, applications 310-312 may provide information to data controller module 314. The information may include data rates for each application 310-312. Then, data controller module 314 may determine which applications 310-312 to reduce the data rate from based on the information.

Figure 5:
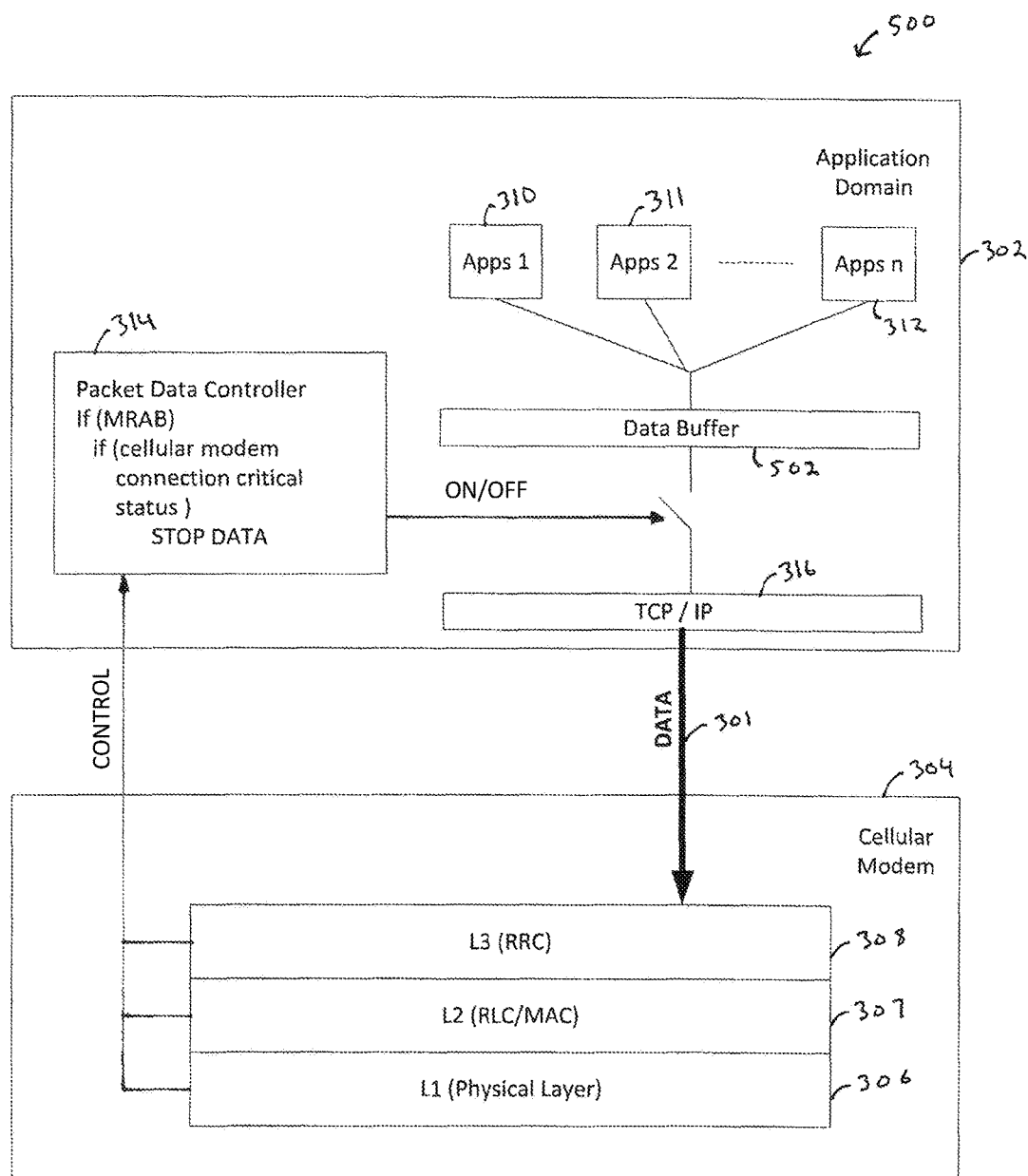
FIG. 5 shows a block diagram of user equipment with a data buffer for buffering communications to applications in the application domain in accordance with one aspect of the present disclosure.

FIG. 5 shows a block diagram of user equipment with a data buffer for buffering communications to applications in the application domain in accordance with one aspect of the present disclosure. In an aspect, user equipment 500 is an example of user equipment 102 as shown in FIG. 1.

User equipment 500 is similar to user equipment 300. However, in this illustrative aspect, buffer 502 may be configured to buffer data 301 before being sent to transport layer 316. Buffer 502 may buffer portions of data 301 coming from all or some of applications 310-312. Also, buffer 502 may discard outdated data in buffer 502.

For example, time sensitive data may be outdated data if held in the buffer too long. Additionally, buffer 502 may be positioned before or after transport layer 316. In another aspect, there is a buffer both before and after transport layer 316. In yet another aspect, buffer 502 may be positioned in cellular modem 304.

Figure 6:
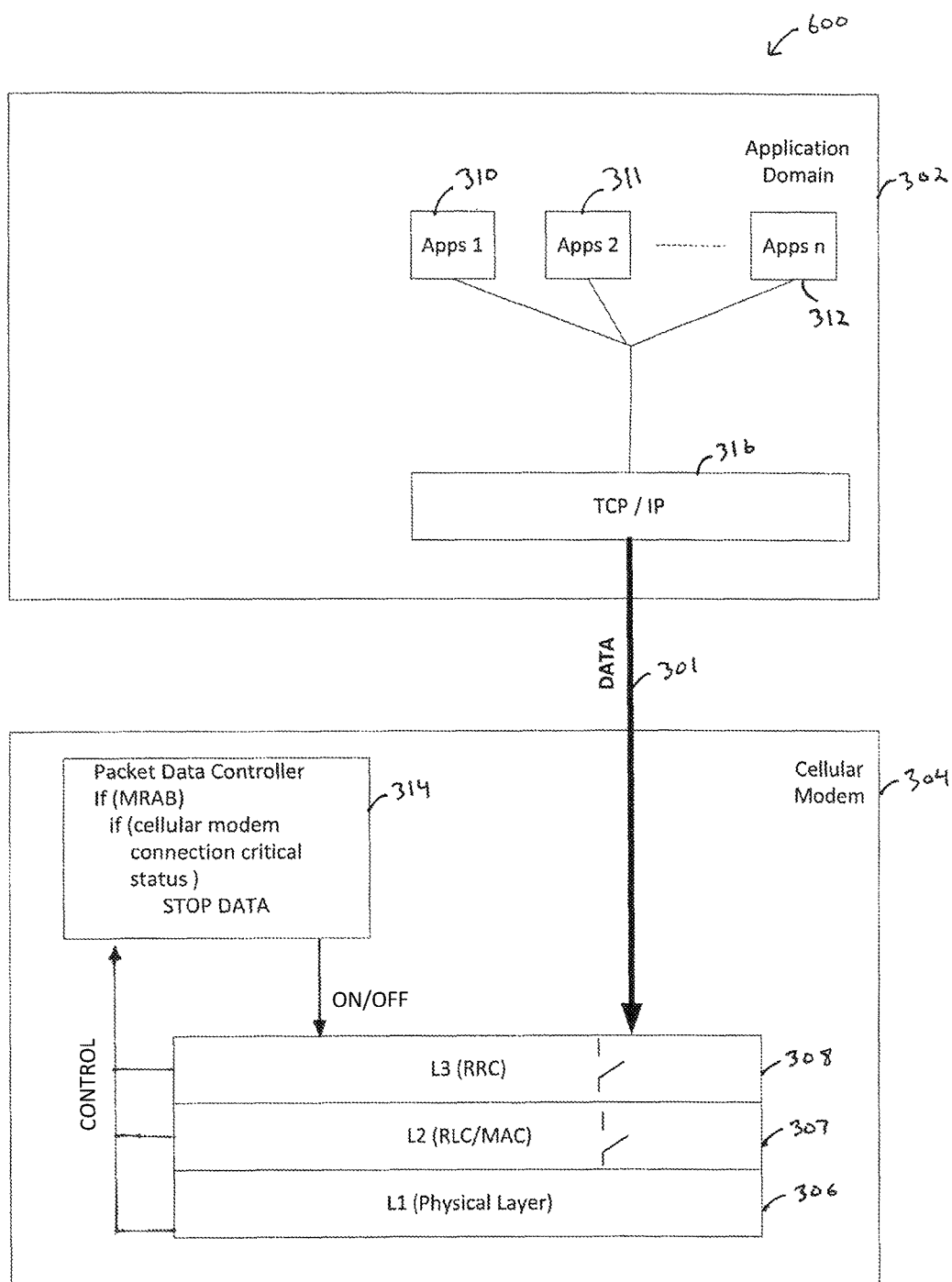
FIG. 6 shows a block diagram of user equipment within a cellular modem in accordance with one aspect of the present disclosure.

FIG. 6 shows a block diagram of user equipment within a cellular modem in accordance with one aspect of the present disclosure. In an aspect, user equipment 600 is an example of user equipment 102 as shown in FIG. 1.

User equipment 600 is similar to user equipment 300. However, in this illustrative aspect, data controller module 314 is located within cellular modem 304. Even while located within cellular modem 314, data controller module 314 may reduce the data rate after applications 310-312. In different aspects, a message is sent to different protocol layers.

Figure 7:
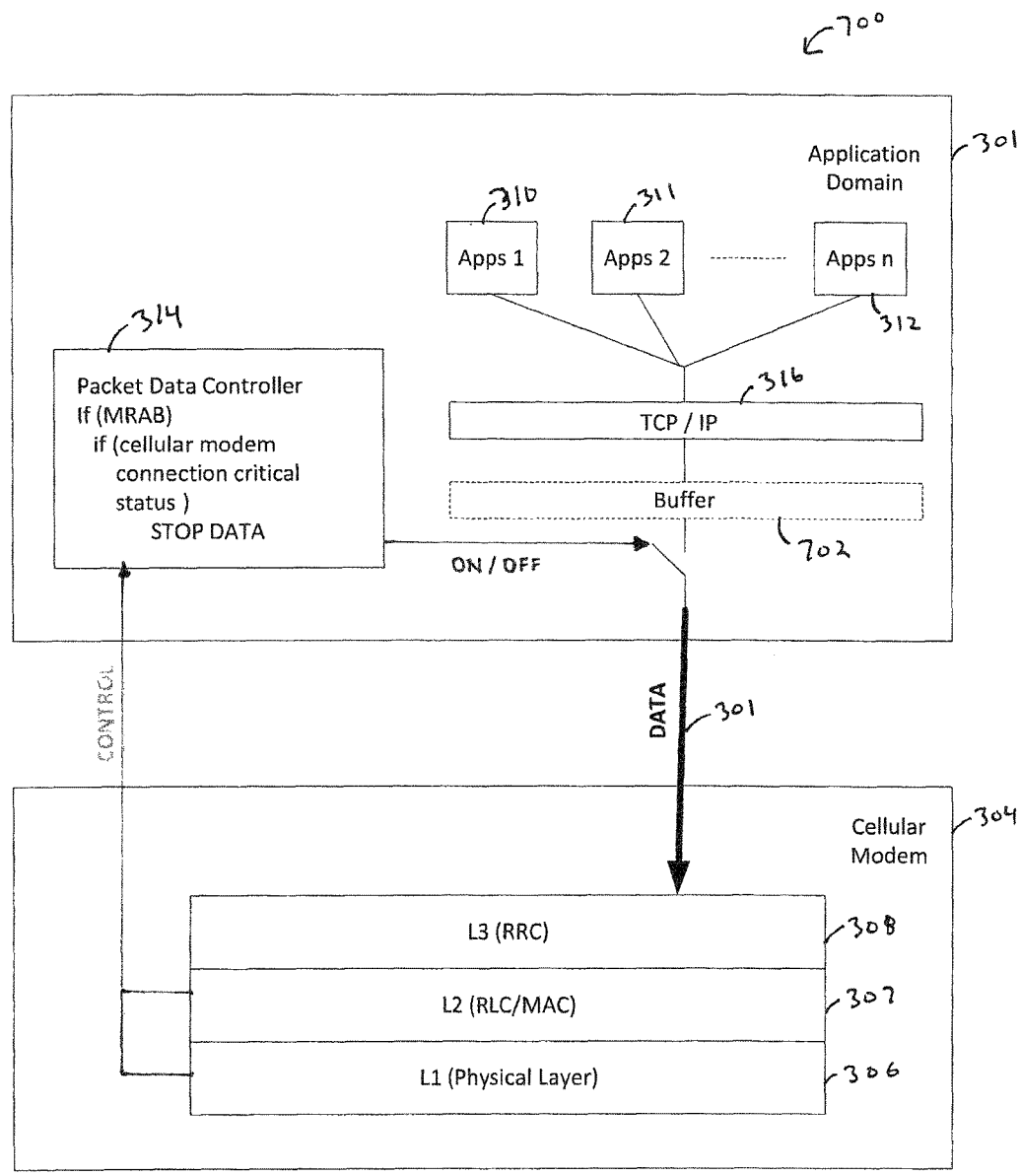
FIG. 7 shows a block diagram of user equipment with a buffer after the transport layer in accordance with one aspect of the present disclosure.

FIG. 7 shows a block diagram of user equipment with a buffer after the transport layer in accordance with one aspect of the present disclosure. In an aspect, user equipment 700 is an example of user equipment 102 as shown in FIG. 1.

User equipment 700 is similar to user equipment 300. However, in this illustrative aspect, data controller module 314 may send a message to transport layer 316 to reduce the data rate. For example, the data rate may be reduced between transport layer 316 and radio resource control layer 308. Additionally, in an aspect, user equipment 700 may have buffer 702 after transport layer 316. In this aspect, the data rate may be reduced after buffer 702.

Figure 8:
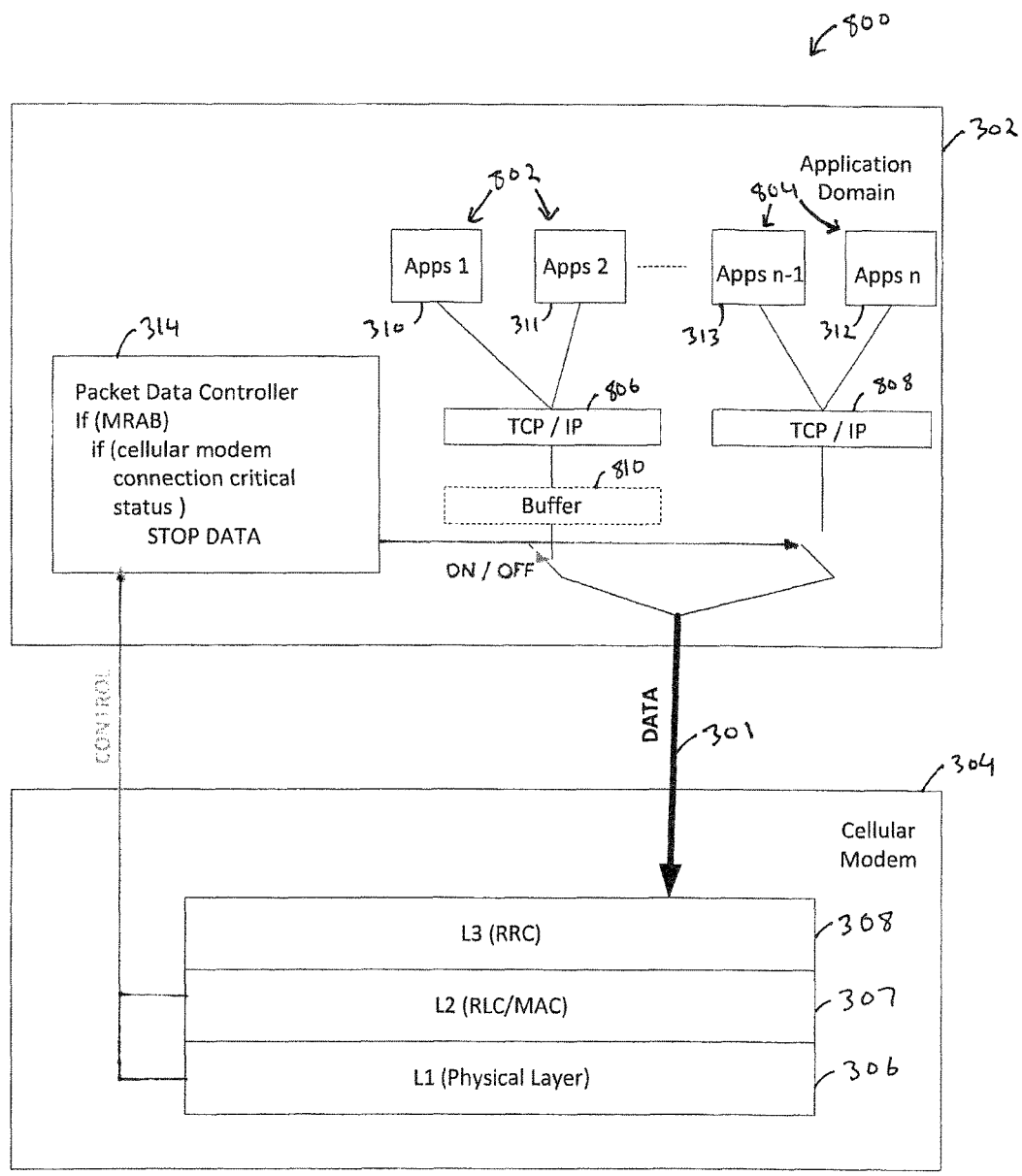
FIG. 8 shows a block diagram of user equipment with separate application sets and different internet protocol streams in accordance with one aspect of the present disclosure.

FIG. 8 shows a block diagram of user equipment with separate application sets and different internet protocol streams in accordance with one aspect of the present disclosure. In an aspect, user equipment 800 is an example of user equipment 102 as shown in FIG. 1.

User equipment 800 is similar to user equipment 300. However, in this illustrative aspect, applications 310-313 are separated into sets 802 and 804. Each set 802 and 804 may have different internet protocol streams 806 and 808 exchanged with radio resource protocol layer 308.

In this aspect, data controller module 314 may reduce the data rate after each separate internet protocol steam 806 and 808. For example, the data rate may be reduced between after internet protocol stream 806 but not 808 and vice versa. Additionally, in an aspect, user equipment 800 may have buffer 810 after internet protocol stream 806. In another aspect, both internet protocol streams 806 and 808 may have a buffer or just internet protocol stream 808. In this aspect, the data rate may be reduced after buffer 810 or any other buffer.

Figure 9:
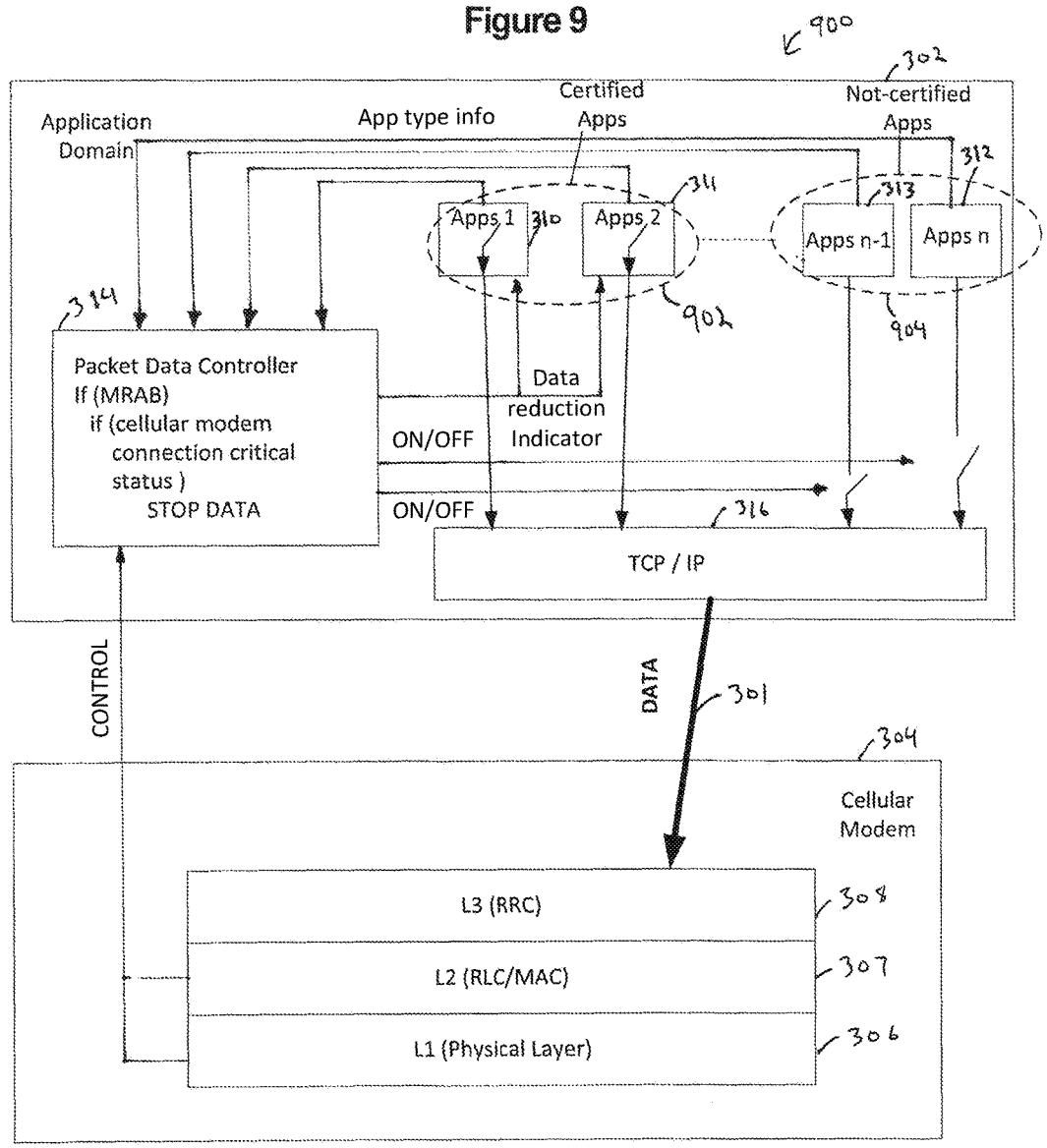
FIG. 9 shows a block diagram of user equipment with certified and non-certified applications in accordance with one aspect of the present disclosure.

FIG. 9 shows a block diagram of user equipment with certified and non-certified applications in accordance with one aspect of the present disclosure. In an aspect, user equipment 900 is an example of user equipment 102 as shown in FIG. 1.

User equipment 900 is similar to user equipment 300. However, in this illustrative aspect, applications 310-313 are separated into sets 902 and 904. Set 902 may be certified applications and set 904 may be non-certified applications. In another aspect, sets 902 and 904 may be separated for other reasons. A certified application may be an application that can reduce its own data rate. A non-certified application may not know how to reduce its own data rate.

In this aspect, data controller module 314 may reduce the data rate after set 904. However, for set 902, data controller module 314 may send to message to applications in set 902 to reduce their own data rate.

In one or more aspects, applications 308-313 may indicate data controller module 314 if they are certified or not-certified applications. In other aspects, data controller module 314 may already know which applications are certified or not-certified.

In various aspects, applications 310-313 may also inform corresponding servers and networks to reduce the data in the downlink. For example, a weather application may indicate to the weather server to reduce or stop the number of updates.

Figure 10:
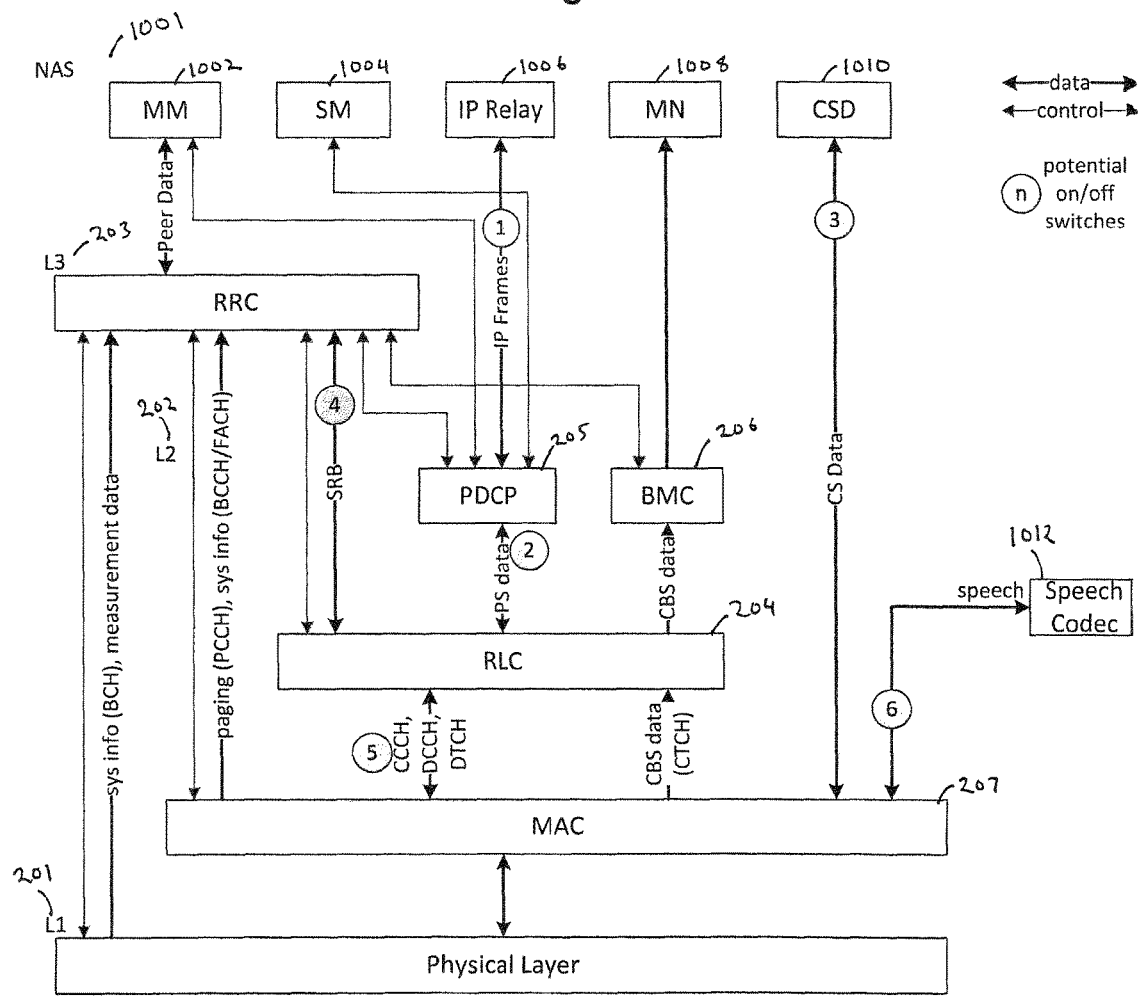
FIG. 10 shows an illustration of a protocol structure for user equipment in accordance with one aspect of the present disclosure.

FIG. 10 shows an illustration of a protocol structure for user equipment in accordance with one aspect of the present disclosure.

User equipment 1000 may include physical layer 201, data link layer 202, network layer 203, and non-access stratum 1001. Layers 201, 202, and 203 may be one example of an aspect as shown in FIG. 2.

The protocol layer arranged above physical layer 201 is data link layer 202, protocol layer 2 on the basis of the OSI reference model, which for its part has a plurality of sub-protocol layers, namely the Medium Access Control protocol Layer 207 (MAC protocol layer), the Radio Link Control protocol layer 204 (RLC protocol layer), the Packet Data Convergence Protocol layer 205 (PDCP protocol layer), and also the Broadcast/Multicast Control protocol layer 206 (BMC protocol layer).

The topmost layer of the UMTS cellular modem is the mobile radio network layer 203 (protocol layer 3 on the basis of the OSI reference model), having the mobile radio resource control unit 207 (Radio Resource Control protocol layer, RRC protocol layer).

Non-access stratum 1001 may be a network layer in a UMTS wireless protocol stack. In an aspect, non-access stratum 1001 may establish and maintain internet protocol connectivity between user equipment 1000 and a wireless network. In an aspect, non-access stratum 1001 may include circuit switched mobility management unit (MM) 1002, packet switched session management unit (SM) 1004, internet protocol relay unit (IP relay) 1006, mobile network unit (MN) 1008, and circuit switched data unit (CSD) 1010.

In an aspect, a data controller module may reduce a data rate of a data type at different locations. FIG. 10 specifically lists six of these locations. However, in other aspects, other locations may be used or more than one of these locations may be used.

In FIG. 10, the locations where data may be reduced are labeled as potential on/off switches. The on/off switches may be reduced variably. For example, the data at each switch does not have to be "on" or "off", the data may be reduced to a slower data rate.

Location 1 is an exchange of IP frames between IP relay 1006 and PDCP protocol layer 205. Location 2 is an exchange of packet switched data between RLC protocol layer 204 and PDCP protocol layer 205. Location 3 is an exchange of circuit switched data between MAC protocol layer 207 and CSD unit 1010. Location 4 is an exchange of signaling radio bearer data between RLC protocol layer 204 and RRC protocol layer 203.

The MAC protocol layer or the units of the MAC protocol layer 207 normally has or have three logical units. The "MAC-d unit" (MAC dedicated unit) handles the user data and the control data, which are mapped onto the dedicated transport channels DCH (Dedicated Channel) via the corresponding dedicated logical channels DTCH (Dedicated Traffic Channel) and DCCH (Dedicated Control Channel), and the Common Control Channel (CCCH). This exchange between MAC protocol layer 207 and RLC protocol layer 204 is also location 5 where data 301 may be reduced.

Additionally, location 6 may be an exchange of speech data between speech codec 1012 and MAC protocol layer 207.

Furthermore, MAC protocol layer 207 also exchanges data 301 with RRC 203 on the Broadcast Control Channel (BCCH), FACH (Forward Access Channel) in the downlink direction, and paging information on the Paging Control Channel (PCCH). Additionally, MAC protocol layer 207 may also exchange cell broadcast service data (CBS) with RLC protocol layer 204 on the Common Traffic Channel (CTCH).

Physical layer 201 may exchange system information with RRC 203 on the Broadcast Channel (BCH) as well as measurement data of information used to determine whether a sensitive condition exists.

The MAC-b unit (MAC broadcast unit) handles only the mobile radio cell-related system information, which is mapped via the logical channel BCCH (Broadcast Control Channel) onto the transport channel BCH (Broadcast Channel) and is broadcast to all of the mobile radio terminals in the respective mobile radio cell.

Figure 11:
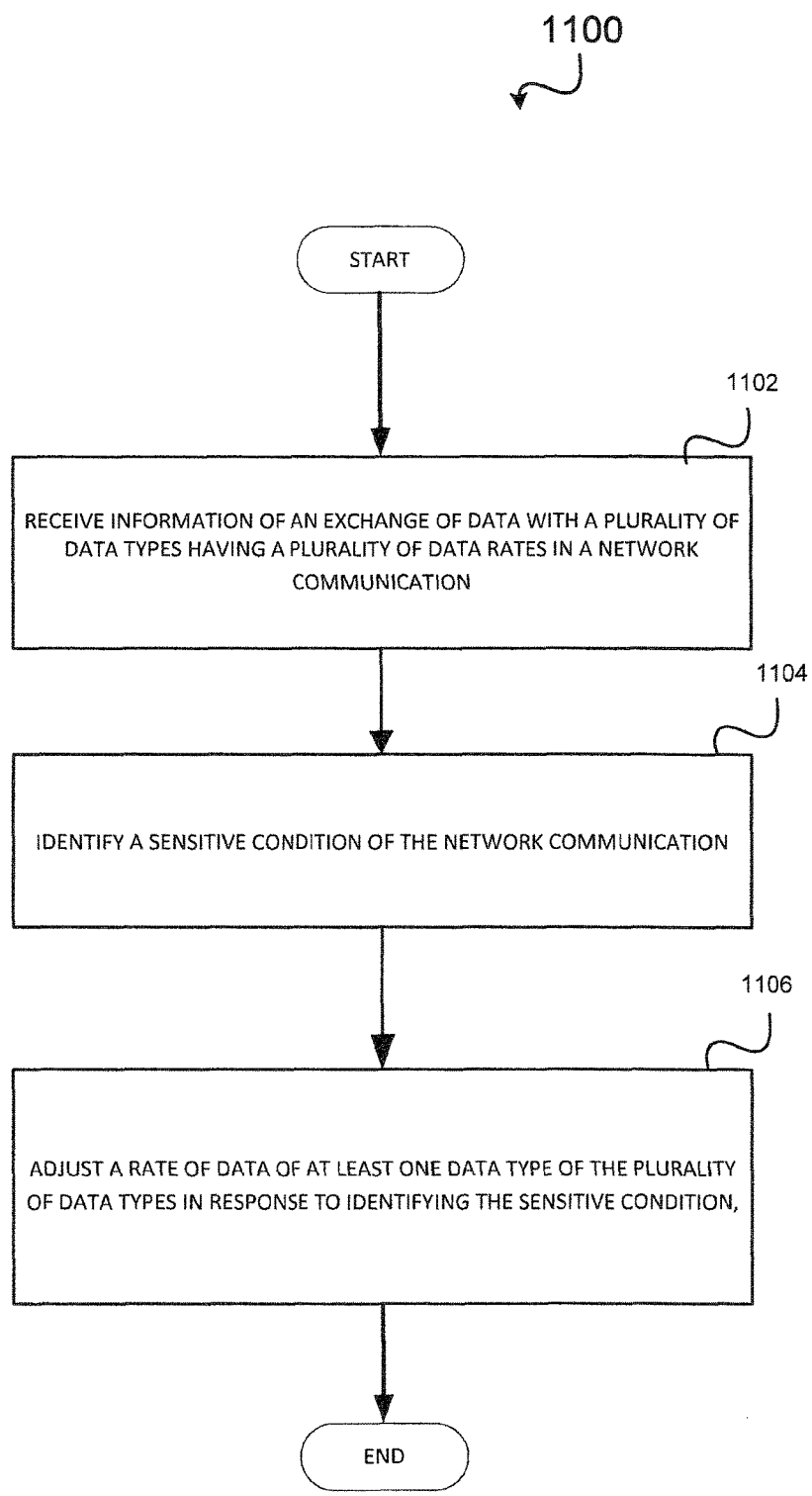
FIG. 11 shows a flowchart of a process for managing signal traffic in accordance with one aspect of the present disclosure.

FIG. 11 shows a flowchart of a process for managing signal traffic in accordance with one aspect of the present disclosure. Process 1100 manages signal traffic by reducing data rates of different data types under sensitive conditions.

Process 1100 begins with receiving information of an exchange of data with a plurality of data types having a plurality of data rates in a network communication (step 1102). The data may be exchanged between a receiving device and a transmitting device. Each device may be an example of a network interface.

In an aspect, a receiving device may be user equipment and the transmitting device may be a base station. The plurality of data types may include packet switched data and circuit switched data. In some aspects, process 1100 may be used during conditions where both packet switched data and circuit switched data are active. These data types are active when those data types are being transmitted and received. Process 1100 may identify whether both types of data are active at any point during process 1100. Also, any step may be conditional and responsive to the result of whether both data types are active.

Packet switched data has a data rate. The data rate may be the size and number of packets of data being transmitted and received by the receiving device.

Next, the process identifies a sensitive condition of the network communication (step 1104). The sensitive condition may be a condition which degrades call quality. Additionally, the sensitive condition may result in an increased risk that a voice call (circuit switched data) may be disconnected. In some aspects, the sensitive condition may be improved if a data rate of packet switched is reduced.

Finally, responsive to identifying the sensitive condition, the process adjusts a rate of data of at least one data type of the plurality of data types (step 1106). In some aspects, the data rate is reduced so low it is terminated. In an aspect, the data is transmitted over a wireless local area network to reduce the data rate. In another aspect, the data within the first data type is prioritized. For example, emails may be prioritized over weather updates.

In one aspect, the data rate is reduced on the end of the transmitter. For example, user equipment may indicate to a base station or servers responsible for producing data sent to the user equipment that the data rate should be reduced. In another aspect, the data rate is reduced on the end of the receiver.

Additionally, in various aspects, the data is produced from a plurality of applications on the user equipment. When the data rate is reduced in step 1106, the data rate may be reduced from any number of applications.

In an aspect, a method is provided for managing signal traffic, the method comprising: receiving information of an exchange of data with a plurality of data types having a plurality of data rates through a communication with a receiving device; identifying a sensitive condition of the communication; and responsive to identifying the sensitive condition, reducing a rate of data of a first data type of the plurality of data types.

Figure 12:
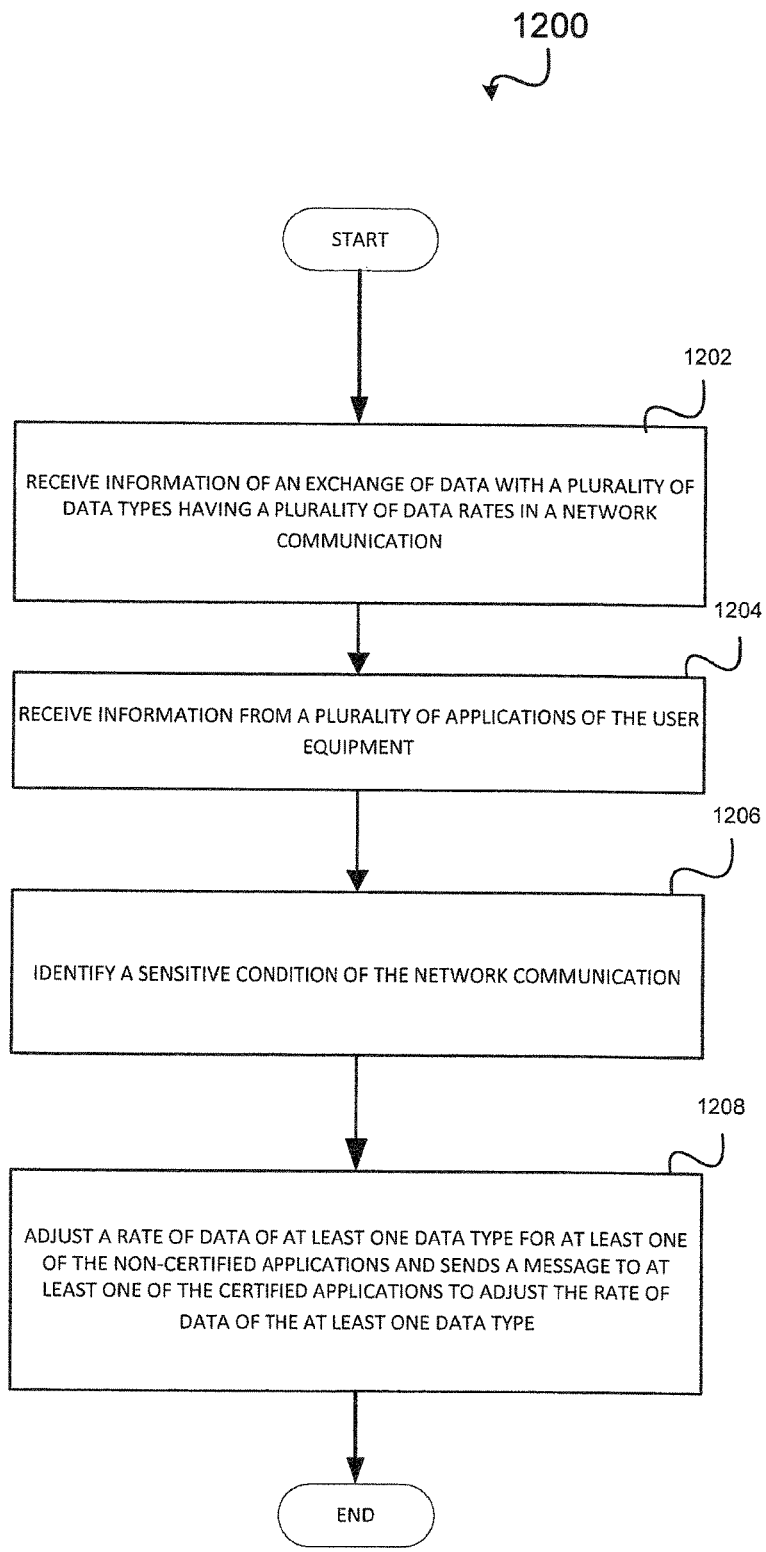
FIG. 12 shows a flowchart of a process for managing signal traffic with certified and non-certified applications in accordance with one aspect of the present disclosure.

FIG. 12 shows a flowchart of a process for managing signal traffic with certified and non-certified applications in accordance with one aspect of the present disclosure. Process 1200 manages signal traffic by reducing data rates of different data types under sensitive conditions.

Process 120 begins with receiving information of an exchange of data with a plurality of data types having a plurality of data rates in a network communication (step 1202). The data may be exchanged between a receiving device and a transmitting device. Each device may be an example of a network interface.

In an aspect, a receiving device may be user equipment and the transmitting device may be a base station. The plurality of data types may include packet switched data and circuit switched data. In some aspects, process 1100 may be used during conditions where both packet switched data and circuit switched data are active. These data types are active when those data types are being transmitted and received. Process 1100 may identify whether both types of data are active at any point during process 1100. Also, any step may be conditional and responsive to the result of whether both data types are active.

Packet switched data has a data rate. The data rate may be the size and number of packets of data being transmitted and received by the receiving device.

Then, the process receives information from a plurality of applications of the user equipment (step 1204). The information may indicate whether each application is a certified application or a non-certified application. A certified application may be an application that can reduce data on its own. A non-certified application may not be capable of reducing its own data rate.

Next, the process identifies a sensitive condition of the network communication (step 1206). The sensitive condition may be a condition which degrades call quality. Additionally, the sensitive condition may result in an increased risk that a voice call (circuit switched data) may be disconnected. In some aspects, the sensitive condition may be improved if a data rate of packet switched is reduced.

Finally, responsive to identifying the sensitive condition, the process adjust a rate of data of at least one data type for at least one of the non-certified applications and sends a message to at least one of the certified applications to adjust the rate of data of the at least one data type (step 1208). In some aspects, the data rate is reduced so low it is terminated. In an aspect, the data is transmitted over a wireless local area network to reduce the data rate. In another aspect, the data within the first data type is prioritized. For example, emails may be prioritized over weather updates. In an aspect, a data controller module may only send messages to the certified applications while not reducing the data rate for any of the non-certified applications. In another aspect, the data controller module may only reduce the data rate coming from the non-certified applications and not send a message to any of the certified applications. In yet another aspect, the data controller module may perform a combination of the above.

In one aspect, the data rate is reduced on the end of the transmitter. For example, user equipment may indicate to a base station or servers responsible for producing data sent to the user equipment that the data rate should be reduced. In another aspect, the data rate is reduced on the end of the receiver.

In an aspect, a method is provided for managing signal traffic, the method comprising: receiving information of an exchange of data with a plurality of data types having a plurality of data rates in a network communication; identifying a sensitive condition of the network communication; and responsive to identifying the sensitive condition, adjusting a rate of data of at least one data type of the plurality of data types.

In an example aspect, the method further comprises identifying whether packet switched data is active in the network communication; and responsive to the packet switched data being active, identifying the sensitive condition of the communication.

In an example aspect, adjusting the rate comprises terminating the exchange of data of the at least one data type.

In an example aspect, data of the at least one data type is produced from a plurality of applications, and wherein adjusting the rate of data of the at least one data type comprises adjusting the rate of data from at least one of the plurality of applications.

In an example aspect, adjusting the data rate of the at least one data type comprises buffering the data of the at least one data type to form buffered data.

In an example aspect, the method further comprises discarding outdated data from the buffered data.

In an example aspect, the sensitive condition is user equipment near a maximum transmission power.

In an example aspect, the sensitive condition is one of preparing and activating compressed mode.

In an example aspect, the sensitive condition is an uplink capacity limit is reached.

In an example aspect, data of the at least one data type is exchanged on a cellular radio network, and wherein adjusting the rate of the data of the at least one data type comprises transmitting the data of the at least one data type over a wireless local area network.

In an example aspect, the method further comprises sending a message to the server of one data type of the at least one data type to withhold exchanging data of the one data type from the exchange of data.

In an example aspect, adjusting the rate of data comprises prioritizing the data having the at least one data type.

In an example aspect, data of the at least one data type is produced from a plurality of applications, and wherein adjusting the rate of data from at least one of the plurality of applications comprises prioritizing the data produced from each of the plurality of applications.

In an example aspect, adjusting the data rate of the at least one data type comprises adjusting the rate of data of data exchanged between an application layer and a network layer.

In an example aspect, adjusting the data rate of the at least one data type comprises adjusting the rate of data of data exchanged between a transport layer and a network layer.

In an example aspect, adjusting the data rate of the at least one data type comprises: adjusting the rate of data of data exchanged between a transport layer and a data link layer.

In an example aspect, adjusting the data rate of the at least one data type comprises adjusting the rate of data of data exchanged between a plurality of sublayers within a data link layer.

In an aspect, a device is provided. The device comprises a data controller module configured to receive information of an exchange of data with a plurality of data types having a plurality of data rates in a network communication; identify a sensitive condition of the network communication; and responsive to identifying the sensitive condition, adjust a rate of data of at least one data type of the plurality of data types.

In an example aspect, the receiving device further comprises a plurality of applications configured to produce one data type of at least one data type, and wherein the data controller is further configured to adjust the rate of data from at least one of the plurality of applications.

In an example aspect, the data controller being configured to adjust the data from at least one of the plurality of applications comprises the data controller being configured to notify to the at least one application of the plurality of applications to adjust the rate of data.

In an example aspect, the device further comprises a buffer configured to buffer the data of the at least one data type to form buffered data.

In an example aspect, the buffer is further configured to discard outdated data from the buffered data.

In an aspect, a system is provided for managing data traffic. The system comprises a device. The receiving device comprises a modem configured to exchange data with a plurality of data types having a plurality of data rates in a network communication. The system also comprises a data controller module electrically coupled to the modem and configured to receive information about the network communication; identify a sensitive condition of the communication; and responsive to identifying the sensitive condition, adjust a rate of data of at least one data type of the plurality of data types to the modem.

In an example aspect, the receiving device further comprises a plurality of applications configured to produce the at least one data type. In an example aspect, the system further comprises a plurality of servers coupled to the network and configured to exchange data of the at least one data type with the plurality of applications, and wherein the data controller is configured to send a message to at least one of the plurality of servers to withhold exchanging data of the at least one data type with at least one corresponding application of the plurality of applications.

The invention claimed is:
1. A method for managing network traffic, the method comprising:
receiving information during an active circuit-switched data session; wherein the information relates to an exchange of data comprising packet-switched data and circuit switched data having a plurality of data rates produced from a plurality of applications in a network communication;
wherein the plurality of applications comprises a first set of applications and a second set of applications;
wherein the first set and the second set receive a message from a controller;
wherein the first set of applications is configured to reduce its own data rate of the packet switched in response to the message from the controller; and
wherein the second set of applications is configured to have its data rate of the packet switched data reduced by the controller;
identifying a sensitive condition within the received information of the network communication;
wherein the sensitive condition is a condition related to an increased risk of disconnection from the active circuit-switched data session;
responsive to identifying the sensitive condition, adjusting a rate of data during the active circuit-switched data session of the packet switched data by at least sending the message to the first set of applications of the plurality of applications; and
buffering the data of the packet switched data to form buffered data;
and wherein the method occurs in a user equipment device.

2. The method of claim 1, further comprising:
identifying whether the packet switched data is active in the network communication; and
responsive to the packet switched data being active, identifying the sensitive condition of the network communication.

3. The method of claim 1, wherein adjusting the rate comprises:
terminating the exchange of data of the packet switched data.

4. The method of claim 1, wherein adjusting the rate of data of the packet switched data further comprises:
adjusting the rate of data from at least one of the plurality of applications.

5. The method of claim 1, further comprising:
discarding outdated data from the buffered data.

6. The method of claim 1, wherein the sensitive condition is a user equipment near a maximum transmission power.

7. The method of claim 1, wherein the sensitive condition is one of preparing and activating compressed mode.

8. The method of claim 1, wherein the sensitive condition is an uplink capacity limit is reached.

9. The method of claim 1, wherein data of the packet switched data are exchanged on a cellular radio network, and wherein adjusting the rate of the data of the packet switched data comprises:
transmitting the data of the packet switched data over a wireless local area network.

10. The method of claim 1, further comprises:
sending the message to the server of the packet switched data to withhold exchanging data of the packet switched data from the exchange of data.

11. The method of claim 1, wherein adjusting the rate of the packet switched data comprises:
prioritizing the data having the circuit switched data.

12. The method of claim 1, wherein adjusting the rate of data of the packet switched data comprises:
prioritizing the data produced from each of the plurality of applications.

13. The method of claim 1, wherein adjusting the rate of data of the packet switched data comprises:
adjusting the rate of data of data exchanged between an application layer and a network layer.

14. The method of claim 1, wherein adjusting the rate of data of the packet switched data comprises:
adjusting the rate of data of data exchanged between a transport layer and a network layer.

15. The method of claim 1, wherein adjusting the rate of data of the packet switched data comprises:
adjusting the rate of data of data exchanged between a transport layer and a data link layer.

16. The method of claim 1, wherein adjusting the rate of data of the packet switched data comprises:
reducing the rate of data of data exchanged between a plurality of sublayers within a data link layer.

17. The method of claim 1, wherein the adjusting a rate of data during the active circuit-switched data session of the packet switched data occurs by decreasing the packet switched data.

18. The method of claim 17, wherein the plurality of applications communicate with a cellular modem for adjusting the rate of data during the active circuit-switched data session of the packet switched data; and wherein the cellular modem comprises one or more switches configured to forward the message to adjust the rate of data of the packet switched data.

19. A user equipment device, comprising:
a data controller circuit, operatively connected to a cellular modem, configured to receive information during an active circuit-switched data session;
wherein the information relates to an exchange of data comprising packet-switched data and circuit switched data having a plurality of data rates produced from a plurality of applications in a network communication;
wherein the plurality of applications comprises a first set of applications and a second set of applications;
wherein the first set and the second set receive a message from the data controller circuit;
wherein the first set of applications is configured to reduce its own data rate of the packet switched data in response to the message from the data controller circuit;
and wherein the second set of applications is configured to have its data rate of the packet switched data reduced by the data controller circuit;
identify a sensitive condition within the received information of the network communication;
wherein the sensitive condition is a condition related to an increased risk of disconnection from the active circuit-switched data session; and
responsive to identifying the sensitive condition, adjust a rate of data of the packet switched data during the active circuit-switched data session by at least sending the message to the first set of applications of the plurality of applications; and
a buffer configured to buffer the data of the packet switched data to form buffered data.

20. The user equipment device of claim 19,
wherein the data controller circuit is further configured to:
adjust the rate of data of the packet switched data from at least one of the plurality of applications.

21. The user equipment device of claim 20, wherein the data controller circuit being configured to adjust the rate of data from the at least one of the plurality of applications comprises the data controller circuit being configured to:
notify the at least one application of the plurality of applications to adjust the rate of data of the packet switched data.

22. The user equipment device of claim 19 wherein the buffer is further configured to:
  discard outdated data from the buffered data.

23. A system for managing data traffic, comprising:
a user equipment device, comprising:
  a modem configured to exchange data with packet and circuit switched data having a plurality of data rates produced from a plurality of applications in a network communication;
  a data controller circuit electrically coupled to the modem and configured to receive information during an active circuit-switched data session; wherein the information relates to an exchange of data comprising packet-switched data and circuit switched data in the network communication;
  wherein the plurality of applications comprises a first set of applications and a second set of applications; wherein the first set and the second set receive a message from the data controller circuit;
  wherein the first set of applications is configured to reduce its own data rate of the packet switched data in response to the message from the data controller circuit; and wherein the second set of applications is configured to have its data rate of the packet switched data reduced by the data controller circuit;
  identify a sensitive condition within the received information of the network communication;
  wherein the sensitive condition is a condition related to an increased risk of disconnection from the active circuit-switched data session; and responsive to identifying the sensitive condition, adjust a rate of data of the packet switched data to the modem during the active circuit-switched data session by at least sending the message to the first set of applications of the plurality of applications; and
  a buffer configured to buffer the data of the packet switched data to form buffered data.

24. The system of claim 23, further comprising:
a plurality of servers coupled to the network and configured to exchange data of the packet switched data with the plurality of applications, and wherein the data controller circuit is configured to send the message to at least one of the plurality of servers to withhold exchanging data of the packet switched data with at least one corresponding application of the plurality of applications.

* * * * *